United States Patent
Odaohhara et al.

(10) Patent No.: US 6,714,016 B2
(45) Date of Patent: Mar. 30, 2004

(54) METHOD FOR DISPLAYING INFORMATION CONCERNING POWER CONSUMPTION AND ELECTRONIC DEVICE

(75) Inventors: Shigefumi Odaohhara, Yamato (JP); Tetsuji Nakamura, Yokohama (JP); Tomoyuki Maruichi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 09/788,252

(22) Filed: Feb. 16, 2001

(65) Prior Publication Data

US 2003/0205995 A1 Nov. 6, 2003

(30) Foreign Application Priority Data

Feb. 17, 2000 (JP) ......................................... 2000-039090

(51) Int. Cl.[7] ..................... G01N 27/416; G01R 31/36; G06F 1/28
(52) U.S. Cl. ................... 324/427; 324/142; 324/103 R; 713/340; 702/63
(58) Field of Search ............................ 324/103 R, 427, 324/435, 134, 142, 765; 713/340, 300; 702/60, 62, 63, 64; 320/149, 116, 128

(56) References Cited

U.S. PATENT DOCUMENTS

| 5,281,955 A | * | 1/1994 | Reich et al. ................. 340/636 |
| 5,434,508 A | * | 7/1995 | Ishida ......................... 324/427 |
| 5,606,242 A | * | 2/1997 | Hull et al. ................... 320/106 |
| 6,078,871 A | * | 6/2000 | Anderson ..................... 702/63 |
| 6,502,044 B1 | * | 12/2002 | Lane et al. .................... 702/63 |

FOREIGN PATENT DOCUMENTS

| JP | 9289742 | 9/1997 | ...................... 7/34 |
| JP | 10-187299 | 7/1998 | ............. G06F/1/28 |
| JP | 10187299 | 10/1998 | ............. G06F/1/28 |

* cited by examiner

Primary Examiner—Anjan K. Deb
(74) Attorney, Agent, or Firm—Carlos Munoz-Bustamante; George E. Grosser

(57) ABSTRACT

An intelligent battery pack in an electronic device such as a PC, sends such information as a voltage, a current, etc. related to power consumption to a controller via a line when the PC is driven by a battery. When the AC adapter is supplying electrical power to the device, the power source is changed to the battery pack once only during the measuring time so as to display data using both measuring and communicating functions of the battery pack. Consequently, no special electric power detector is provided in the power supply system of the AC adapter.

5 Claims, 7 Drawing Sheets

METHOD FOR DISPLAYING INFORMATION CONCERNING POWER CONSUMPTION AND ELECTRONIC DEVICE

FIELD OF THE INVENTION

The present invention relates to a technique for displaying information concerning power consumption on a display in an electronic device driven by a battery, and more particularly to a technique for displaying information concerning power consumption with use of data received from an intelligent battery pack.

BACKGROUND OF THE INVENTION

Lap-top personal computers (PC) are very convenient to use because they are provided with a rechargeable battery pack so they can be used anywhere commercial power supply is unavailable, away from homes and offices where they are usually used. On the other hand, the battery pack of such the lap-top PC can be charged by a commercial power source via an AC adapter connected to the power source after it is discharged by use away from the user's home/office. If such a PC is driven by a rechargeable battery, it is desired first that the PC can operate as long as possible after it is charged once. In order to extend such a continuous battery driving time of the PC, therefore, there have been continued efforts to improve the battery, reduce the power consumption of each component in the PC, etc. In addition, there have also been adopted techniques for lowering the clock frequency of the CPU in accordance with the operation state of the PC, as well as stopping electric power supplied to the CPU and peripheral devices of the PC so as to be automatically shifted between the normal operation mode and the energy-saving mode.

While a PC is driven by a battery, the voltage of the battery can drop abruptly and sometimes processed data is lost or scheduled work is disabled. To avoid such troubles, therefore, various techniques are adopted so as to provide the user with data denoting the residual capacity of the battery. According to those techniques, a battery, an MPU, a memory, etc. are combined so as to compose a battery pack. The MPU detects such battery-related parameter values as the voltage, electric power, temperature, etc. of the battery being discharged. Then, the battery residual capacity is calculated according to those parameter values with reference to the data specific to the battery stored in the memory beforehand. In this specification, such a battery pack is referred to as an intelligent battery pack (hereafter, to be referred simply to as a battery pack or intelligent battery pack). The battery pack has a communication line connected to the subject system, so that the residual capacity calculated by the MPU and the parameter values detected by the MPU are sent to the system. The system then displays the residual capacity information of the battery received from the MPU on a display and uses other parameter values as information of the electric power managed by the OS.

Published Unexamined Patent Application No. 9-289742 discloses a technique for estimating a residual capacity of a battery accurately in an electronic device provided with a battery and an AC adapter as power sources. According to this technique, while the subject PC is driven by the AC adapter and the battery is charged so as to measure its voltage and know the residual capacity, charging of the battery by the AC adapter is stopped once, thereby the voltage of the battery is measured while no charging current flows in itself.

On the other hand, Published Unexamined Patent Application No. 10-187299 discloses a technique for notifying the user of a residual capacity of the subject battery accurately in a portable information device driven by a plurality of batteries that can communicate information including the voltage or residual capacity of each of those batteries. According to this technique, when the information concerning the residual capacity of the battery is obtained, the subject battery is put under an actual load once, then the residual capacity is measured, thereby calculating the residual capacity more accurately.

The power consumption of a PC is also changed by an executed application program. In order to extend the operation time of a PC driven by a battery, therefore, the user must think out a proper idea for running the object application program. It is one of the methods for solving the problem. According to this method, however, the user should always know the type of the object application program, as well as the relationship between the execution state and the power consumption of the PC. Of course, it should be avoided to execute application programs unnecessarily so as to reduce the power consumption even when the PC is driven by a commercial power source.

As disclosed in the above specification, the residual capacity of the conventional battery is displayed on a screen. The information provided to the user in this way, however, is not enough to reduce the power consumption of the PC and extend the battery driving time by selecting how to use the PC, that is, a proper execution method of each application program.

Operating systems (OS) such as Windows (Windows is a trademark of Microsoft Corp.) and OS/2 (OS/2 is a trademark of IBM Corp.) have a tool from the beginning. The tool notifies the user of the running state of the CPU decided by an execution method of the subject application program from the beginning. The tool is, for example, a performance meter (also referred to as a performance monitor, a system monitor, a system activity monitor, etc.). The tool counts the number of clocks of the CPU so as to notify the user of the running state of the CPU. For lap-top PCs, however, the actual operation state of the CPU cannot be notified correctly, since such lap-top PCs employ a power management method that stops the CPU clock respectively as needed. In addition, the performance meter does not provide the user with information related to the power consumption of the system and the tool is not enough for the user to think out a proper method for using the PC so as to reduce the power consumption.

Under such circumstances, it is an object of the present invention to provide an electronic device driven by a battery and enabled to display information of its power consumption on a display screen. It is another object of the present invention to provide an electronic device driven by an intelligent battery pack enabling the sending of information concerning power consumption and enabled to display information concurring power consumption obtained from the battery pack on a display screen. It is still another object of the present invention to provide an electronic device driven by an AC adapter or intelligent battery pack and enabled to display information concerning power consumption on a display screen even when it is driven by any of the above power sources. It is still another object of the present invention to provide an electronic device driven by an intelligent battery pack or AC adapter and enabled to display information concerning power consumption on a screen with use of a simple means.

SUMMARY OF THE INVENTION

An embodiment of the present invention is an electronic device provided with a display and driven by a battery. The electronic device comprises means for detecting information concerning power consumption of the electronic device and means for displaying the detected information concerning power consumption on the display screen. Such information concerning power consumption should preferably be obtained beforehand so as to extend the battery driving time as long as possible in the above electronic device driven by the battery. The display is effective as a user interface for visualizing information concerning power consumption, so the user can know the power consumption of the electronic device easily from the displayed information concerning power consumption.

The means for detecting information concerning power consumption may be any that can detect the state of electric power supply from any of the AC adapter and the battery. The battery may be any of chargeable and non-chargeable ones. The unit of information concerning power consumption may be any of an electric power, a current, and a substitute value related directly to those items. The substitute value may be, for example, a percentage rate of actual power consumption to the maximum power consumption.

Another embodiment of the present invention is an electronic device driven by a battery pack enabling the sending of information of its power consumption. The electronic device comprises a micro-controller for receiving information concerning power consumption from the battery pack and outputting the information of the power consumption and a display for displaying the information of the power consumption received from the micro-controller. In this embodiment, because the battery pack itself sends the information of its power consumption to the electronic device, there is no need to specially prepare a circuit for detecting information of such the power consumption. In addition, the micro-controller processes the information of the power consumption received from the battery pack and outputs the processed information of the power consumption, thereby a method for displaying the information can be employed appropriately to the use purpose.

Still another embodiment of the present invention is an electronic device driven by an AC adapter or battery pack enabling the sending of information of its power consumption. The electronic device is provided with a controllable switch for shutting off the electric power supplied from the AC adapter so as to select the power supply from the battery pack for a predetermined time when the AC adapter supplies an electric power to the electronic device; a micro-controller for outputting a control signal to the switch so as to shut off the power supply from the AC adapter and receive information concerning power consumption from the battery pack and outputs the information; and a display for displaying the information of the power consumption received from the micro-controller.

In this embodiment, it is possible to obtain information of the power consumption from the battery pack by setting the switch circuit so as to supply the electric power to the electronic device from the battery pack even when the electronic device is driven by the AC adapter. The electric power can thus be displayed when the electronic device is driven by the AC adapter.

According to the present invention therefore, it is possible to provide an electronic device driven by a battery and enabled to display information concerning power consumption on its display screen. It is also possible to provide an electronic device driven by an intelligent battery pack that can send information concerning power consumption and enabled to display information concerning power consumption received from the battery pack. It is still possible to provide an electronic device driven by an AC adapter or intelligent battery pack and enabled to display information concerning power consumption regardless of the power source (AC adapter and intelligent battery pack). And, it is still possible to provide an electronic device driven by an intelligent battery pack or AC adapter and enabled to display information concerning power consumption with use of a simple means.

DETAILED DESCRIPTION OF THE INVENTION

Hereunder, the preferred embodiments of the present invention will be described, by way of example only, with reference to the accompanying drawings.

Figure 1:
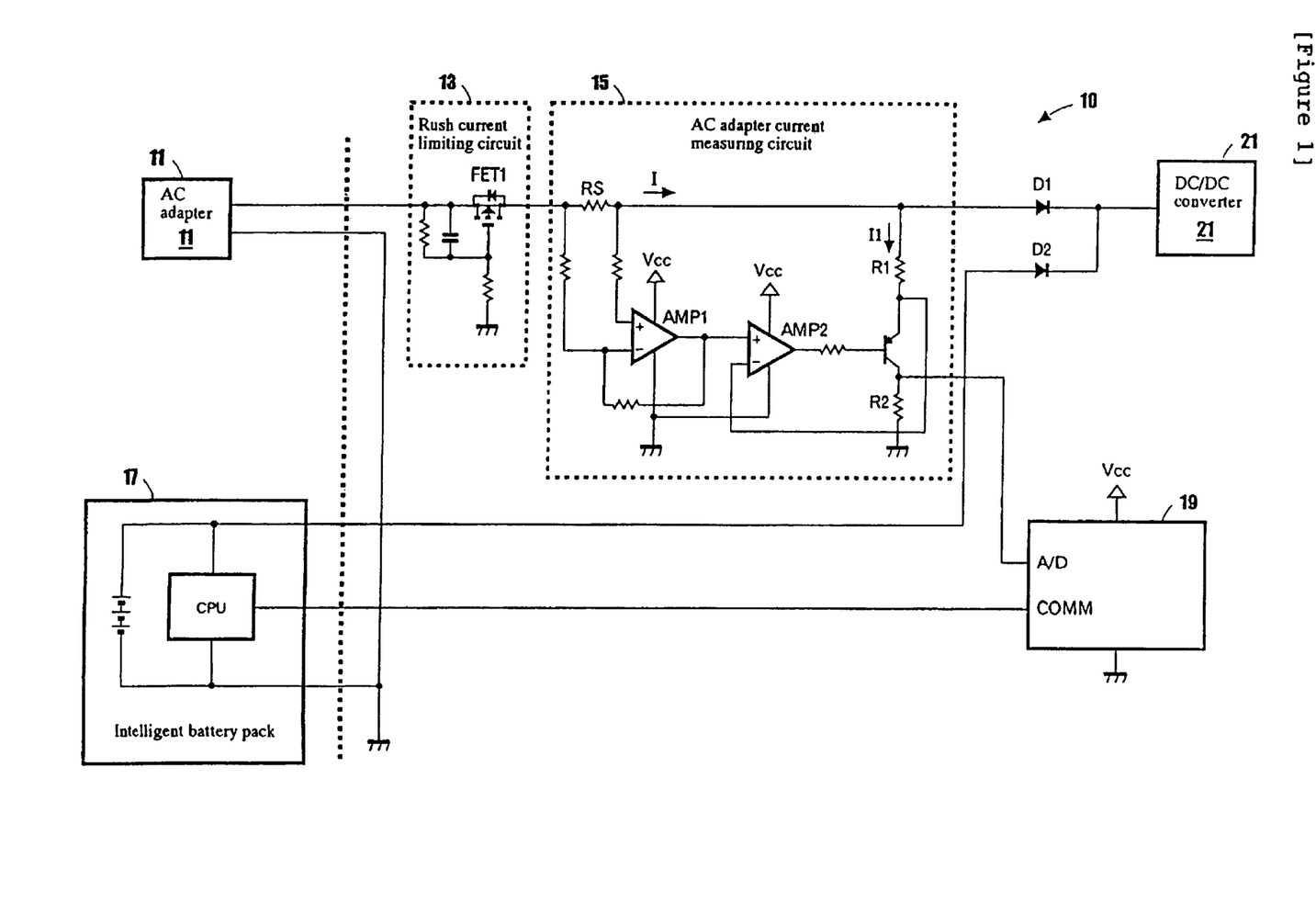
FIG. 1 is a partial schematic block diagram of a lap-top personal computer in an embodiment of the present invention.

FIG. 1 is a schematic partial block diagram of a PC for which an intelligent battery pack is employed. The intelligent battery pack 17, while supplying an electric power to a DC/DC converter of the PC 10, transfers a voltage value, a current value, etc. of the battery to a micro-controller 19. If the PC 10 is driven by a commercial power source to which an AC adapter 11 is connected, the PC can be provided with an AC adapter current measuring circuit 15 so as to measure the current flowing therein. Consequently, the power consumption of the PC 10 can be displayed with a well-known method so that information of the power consumption sent from the battery pack is displayed when the PC is driven by the battery pack and the information calculated from the current collected in the AC adapter current measuring circuit is displayed when the PC 10 is driven by the commercial power source.

Figure 2:
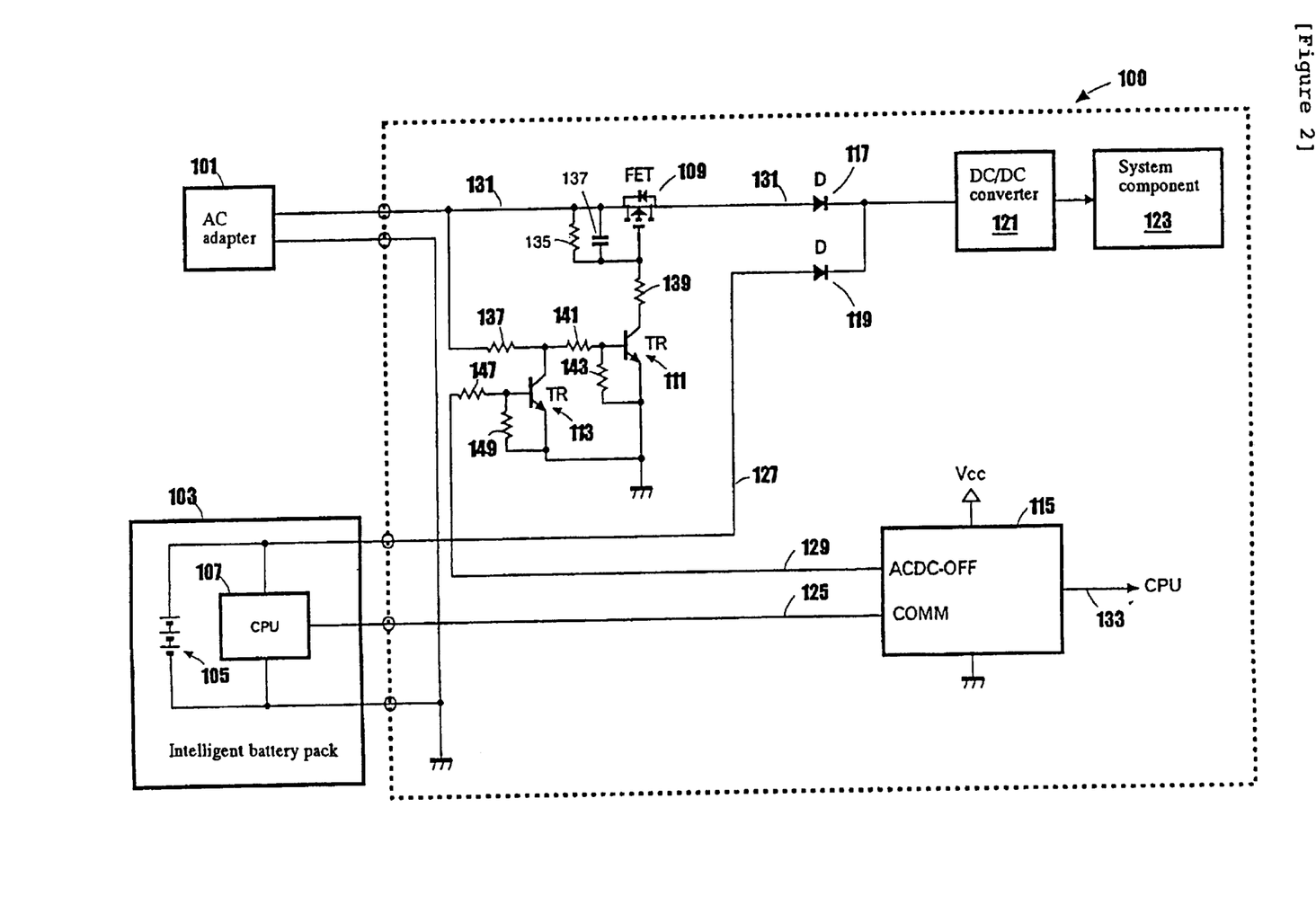
FIG. 2 is a partial schematic block diagram of a lap-top personal computer in the embodiment of the present invention.

FIG. 2 shows a schematic partial block diagram of a PC whose circuit configuration is further simplified. The PC 100 can be driven by both battery and commercial power source. When the PC 100 is driven by a commercial power source, an AC adapter 101, which is a power source, is connected to the PC 100. The AC adapter 101 converts an AC voltage of the commercial power source to a DC voltage supplied to the PC 100. The battery is an intelligent battery pack 103 provided with communication functions. It can be removably attached to the PC 100 body. The battery pack 103 includes a Li-ion battery 105, a CPU 107 and a protection circuit (not illustrated). The CPU 107 measures the voltage, charging/discharging current, and temperature of the battery and decides the over-current/over-voltage protection level, over-discharging level, abnormal temperature, etc. according to the measured data. The CPU 107 also calculates the residual capacity of the battery 105 and communicates with the PC 100. The battery pack 103 may be a type conforming to the SBS (Smart Battery System) Standard developed by Intel Inc. and Duracell Inc. The battery pack 107 sends such data as the temperature of the battery cell, the terminal voltage of the battery pack, the charging/discharging current, the residual capacity, etc. to the PC 100 body periodically or to the system according to a request from the PC 100.

The battery pack 103 is connected to an embedded controller or micro-controller 115 via a communication line 125. The embedded controller 115 is a peripheral controller provided so as to make thermal management, power management, etc. for the PC 100. The controller 115 should preferably be a one-chip microcomputer H8/300 of Hitachi Inc. This type controller has a 16-bit processor, as well as a RAM, a ROM, a timer, etc. in itself and controls those items programmably. And, the controller 115 is connected to the system via the communication line 133 so as to communicate with the CPU (not illustrated) or another component. The communication lines 125 and 133 are composed of an I2C (Inter-Integrated Circuit) bus respectively. The I2C bus manufactured by Phillips Inc. is a slow serial bus regarded as standard in the industry. The I2C bus is used to monitor and control the functions of the object peripheral device.

On the other hand, the AC adapter 101 is connected to the source of an FET 109 via an electric power line 131. The drain of the FET 109 is connected to the input of a DC/DC converter 121 via a diode 117. In addition, the input of the DC/DC converter 121 is connected to a battery pack 103 via both diode 119 and electric power line 127. The DC/DC converter 121 stabilizes the DC voltage supplied from the AC adapter 101 or battery pack 103. It also converts the DC voltage to a plurality of voltages required for the system of the PC 100. The output of the DC/DC converter 121 is also connected to a system component 123 so as to supply a predetermined stable voltage. The system component 123 includes such components as a CPU, a display, a memory, a keyboard, a hard disk etc. that require an electric power respectively in the PC 100.

The gate of the FET 109 is connected to the collector of the transistor 111 via a resistor 139. A resistor 135 and a capacitor 137 are connected in parallel between the gate of the FET 109 and a line 131. Resistors 141 and 137 are connected serially to the base of the transistor 111. The resistor 137 is connected to the line 131. A resistor 143 is connected between the base and the emitter of the transistor 111 and the emitter is connected to the ground. The collector of the transistor 113 is connected to both resistors 141 and 137 and the base of the transistor 113 is connected to the controller 115 through a line 129 via a resistor 147. A resistor 149 is connected to between the base and the emitter of the transistor 113. The emitter is connected to the ground.

Next, the operation of the PC composed as described above will be described as an embodiment of the present invention. It is premised here that the AC adapter 101 is not connected to the PC 100 and a battery pack 103 installed in the PC 100 supplies an electric power to the system component 123 via an electric power line 127, a diode 119, and a DC/DC converter 121 respectively so as to drive the PC 100. Because the diode 117 exists, while the AC adapter is not connected to the PC 100, the system component uses the electric power supplied from the battery 105. Consequently, the electric power consumed by the PC 100 is equal to the electric power supplied from the battery pack 103. The battery pack 103 sends the discharged current value and the terminal voltage value of the battery pack to the controller 115 periodically via a communication line 125 or in response to a request from the controller 115.

The controller 115 calculates an electric power value from both received current value and terminal voltage value. The electric power value is sent to the CPU via a line 133 and displayed on the display screen. The controller 115 calculates the power consumption of the PC from both discharged current value and terminal voltage value received respectively. However, the CPU 107 of the battery pack 103 may calculate the electric power so that the controller 115 receives the electric power value directly from the CPU 107. And, although the controller 115 sends an electric power value to the CPU of the PC 100, the controller 115 may send the discharged current value of the battery 105 to the CPU as a substitute value of the power consumption.

Next, a description will be made for the operation of the PC 100 when the AC adapter 101 is connected to the PC 100. The AC adapter 101, when connected to the computer 100, supplies an electric power to the computer 100 via an electric power line 131 and a dedicated hardware mechanism (not illustrated) sends the connected AC adapter information to the controller 115. The level of the ACDC-OFF signal output from the controller 115 is low unless otherwise directed from a program while the AC adapter 101 is connected to the PC 100 and a predetermined supply voltage Vcc is applied to the PC 100. The ACDC-OFF signal is driven into the high-impedance state if the AC adapter is not connected to the PC 100 and the Vcc is 0, since the battery pack 103 is not installed. If the AC adapter is connected, the level of the ACDC-OFF signal is low, therefore, the transistor 113 is turned off and the transistor 111 is turned on.

The FET 109 is off just after the AC adapter 101 is connected to the PC 100. However, the gate voltage of the FET 109 goes low as the capacitor 137 is charged. The FET 109 is turned on slowly. This is to suppress an excessive rush current from flowing into the PC so as to charge the capacitor when the AC adapter 101 is connected to the PC 100. If the FET 109 is turned on, a current flows into the converter 121 via the diode 117. The output voltage from the AC adapter 101 is set a little higher than that received from the battery pack 107. Consequently, no current flows into the PC 100 from the battery 105 even when the battery pack 103 is installed. And, the diode 119 never causes a current to flow into the battery pack 103 from the AC adapter 101.

The controller 115 drives the ACDC-OFF signal to the high level so as to display the information of the full power consumption of the system component 123 on the display while the AC adapter supplies a stable electric power to the PC 100 such way. And, when the level of the ACDC-OFF signal becomes high, the transistor 113 is turned on, thereby the transistor 111 is turned off. As a result, the same voltage is applied to both gate and source of the FET 109. The FET 109 is thus turned off. If the FET 109 is turned off, the voltage of the power line 131 drops, thereby the voltage of the power line 127 becomes higher than the voltage of the power line 131. The power supply to the DC/DC converter 121 is thus switched to that from the battery pack 103.

If the PC 100 is driven by a battery pack, the battery pack 103 sends both discharged current value and terminal voltage value to the controller 115 via a communication line 125. The controller 115 calculates data so as to display an electric power as needed, then sends the data to the CPU of the PC 100 so as to be displayed. The controller 115 turns off the FET 109 for a predetermined time, which is required to display the electric power value. The controller 115 then drives the ACDC-OFF signal to the low level so as to turn off the transistor 113 and turn on the transistor 111, thereby turning on the FET 109 and restoring the power supply from the AC adapter.

If the PC 100 is driven by the battery pack 103, the data received from the battery pack is used. If the PC 100 is driven by the AC adapter 101, the FET 109 is turned off during a measuring time under the control of the controller 115. This is to select the battery pack and collect data. The power consumption of the system component can thus be displayed on the display screen in any of the above cases.

The combination of the FET 109, the resistors 135 and 139, as well as the capacitor 137 is equivalent to the rush current limiting circuit 13 shown in FIG. 1, which is used to suppress the rush current applied to the PC 100 from the AC adapter. The combination is not provided specially for the present invention, but the present invention is not limited only to this method; a dedicated switch may be included in the configuration. And, the charging circuit of the battery pack 103 is omitted from the configuration. However, because the battery 105 is charged while the PC 100 is driven by the AC adapter, the battery 105 is never over-discharged even when the power source is changed to the battery pack while the PC 100 is driven by the AC adapter. When the PC 100 is driven by the AC adapter 101, a period during which the battery pack is used as the power source is limited only within a necessary time range required to obtain display data so as to keep charging of the battery pack.

Figure 3:
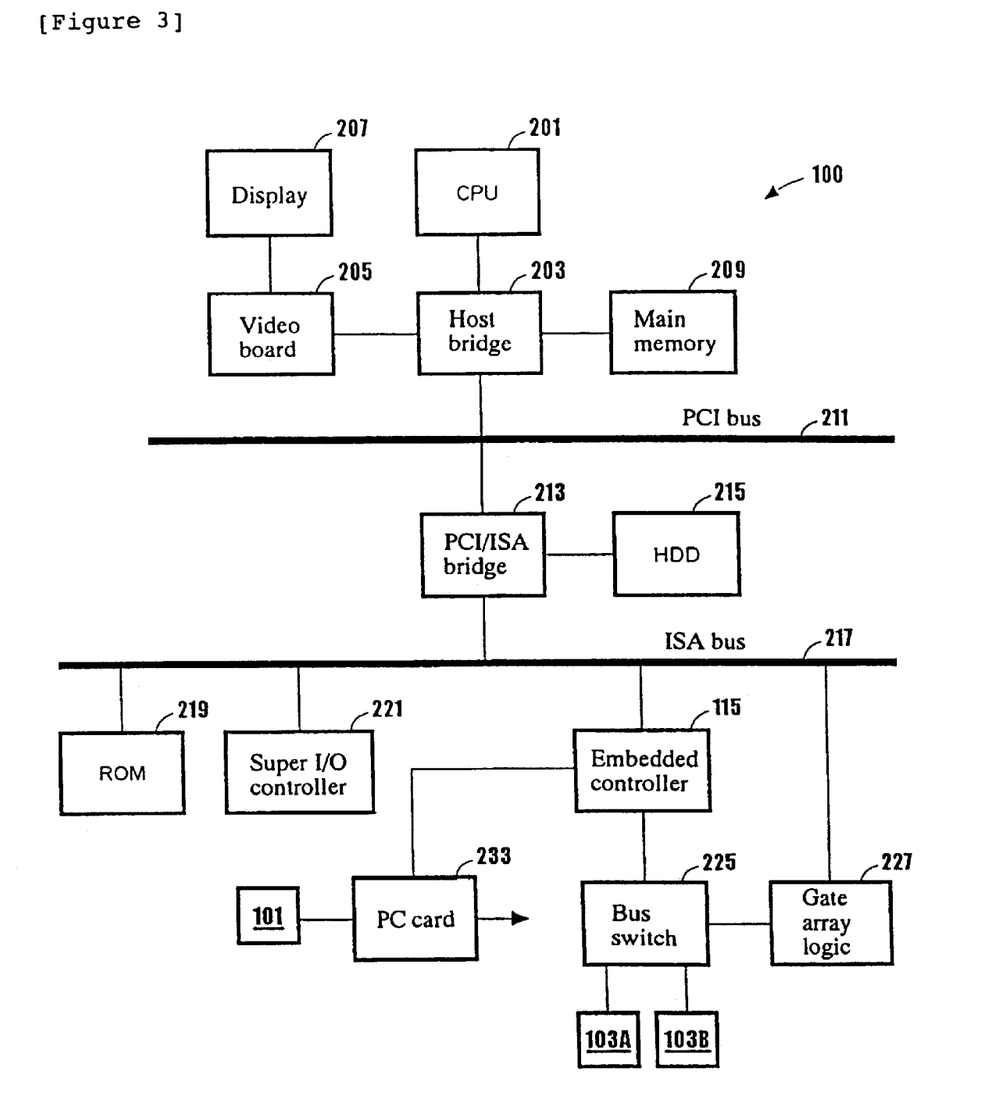
FIG. 3 is a schematic block diagram for an entire view of the lap-top personal computer shown in FIG. 2.

FIG. 3 shows a schematic block diagram of the system component of the PC 100. The same reference numbers are assigned to the same items as those of the component shown in FIG. 1. A host bridge 203 is connected to a CPU 201, a main memory 209, a video board 205, and a PCI bus 211 respectively. The video board 205 is connected to a display 207. The host bridge 203 is also referred to as a system controller or north bridge. It is a chip set including a system bus interface for controlling the system bus connected to the CPU 201; a PCI bus controller for controlling various extended cards connected to PCI bus sockets; an AGP controller for controlling a video board 205 connected to AGP sockets; and a memory controller for controlling the main memory 209.

The PCI/ISA bridge 213 is connected to a PCI bus 211; an HDD (Hard Disk Drive) 215; and an ISA bus 217 respectively. The PCI/ISA bridge is also referred to as a south bridge. It is composed of a DMA controller; a programmable interrupt controller (PIC); a programmable interval timer (PIT); an IDE interface for the HDD 215. The PCI/ISA bridge is also provided with USB functions and SMB interface functions.

The ISA bus 217 is connected to a flash ROM 219 for storing the system BIOS; a super I/O controller 221; an embedded controller 115; and a gate logic array 227. The super I/O controller 221 is a chip for providing the PC with such interface functions as a parallel port, a serial port, an FDD (Floppy Disk Drive), etc. The gate array logic is provided with a register in itself, so that it can store data received from the controller 115 temporarily.

The embedded controller 115 is connected to a bus switch 225 and a DC card 233. The DC card 233 is provided so as to supply a stable voltage to each component of the PC 100. It is composed of a battery charger, a DC/DC converter, etc. The DC card is connected to the AC adapter 101. The bus switch 225 is connected to the main battery 103A, the second battery 103B (both batteries 103A and 103B are intelligent batteries), and the gate array logic 227 via the I2C bus. The bus switch 225 functions as a multiplexer for switching communications between the embedded controller 115 and each of those components under the control of the controller 115. If the controller 115 has a plurality of I2C ports enough to communicate with the batteries and the gate array logic 227, the bus switch 225 is omissible. FIG. 3 shows a schematic block diagram for a configuration of the PC 100 with respect to its components. Components and connections that are not required for describing the present invention are all omitted. Next, a description will be made for how to display the power consumption on the display 207 with respect to the various components of the PC 100 shown in FIG. 3. The controller 115 switches the bus switch 225 to obtain power consumption data from the main battery 103A and the second battery 103B and updates the data in the internal memory. In addition, the controller 115 also stores data in the register of the gate array logic and updates the data periodically. This data, as described with reference to FIG. 2, is obtained when the AC adapter 101 is used as a power source and when the battery 103 is used as a power source.

Because the power consumption of the PC 100 is stored such way in both of the controller 115 and the gate array logic 227, the CPU 201 can access either of them to obtain and display the power consumption data on the display 207. The object component from which the CPU 201 obtains the data depends on both OS and BIOS of the PC 100.

Figure 4:
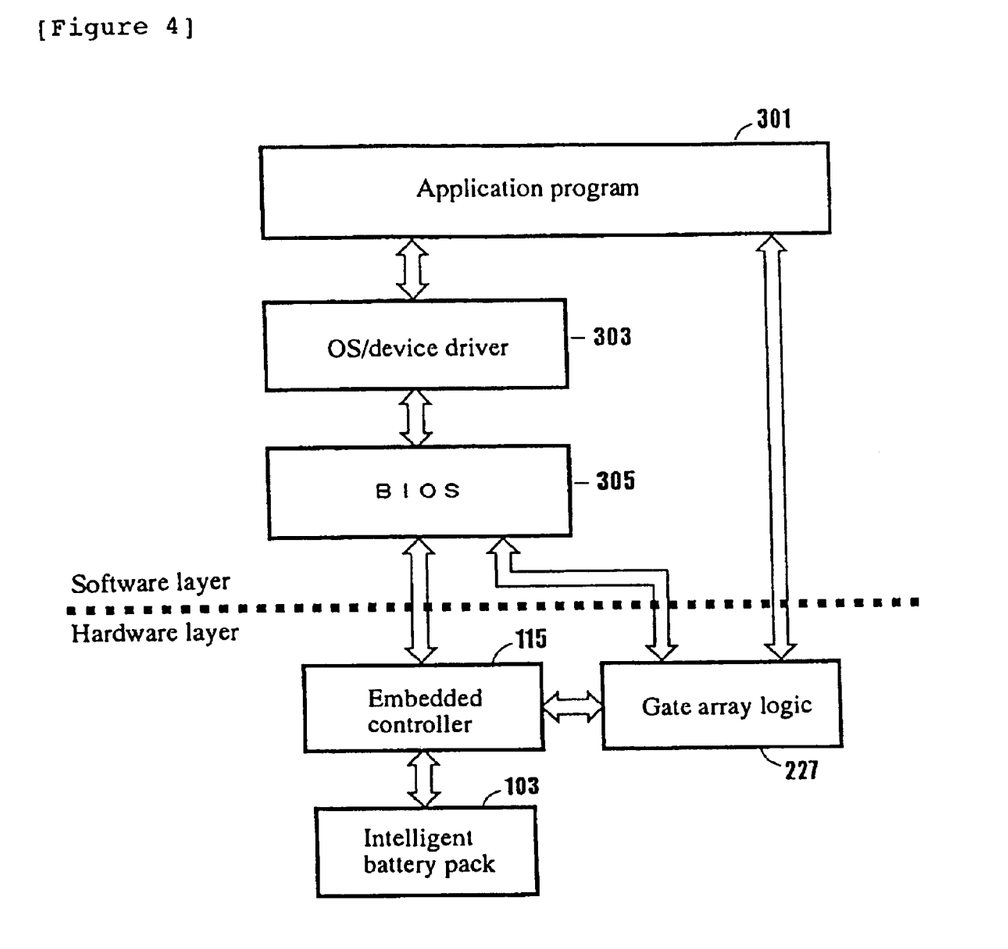
FIG. 4 is an embodiment of a hierarchical structure of the software for collecting power consumption data with use of the PC shown in FIG. 2.

FIG. 4 shows an embodiment of a software hierarchical structure for collecting power consumption data in the PC 100. The application program 301 is used to display the power consumption of the PC 100 on the display 207. The program 301 provides the user with a screen configuration, which functions as a user interface and enables the user to select a data updating period. There are two methods for enabling the application program 301 to obtain power consumption data; obtaining data with use of an OS service and obtaining data without depending on the OS.

If the OS/device driver 303 supports the ACPI (Advanced Configuration and Power Interface), which denotes interface specifications for managing power sources in a personal computer. The ACPI is proposed by Microsoft USA just like Windows98 (Windows is a trademark of Microsoft Inc.), the BIOS 305 is prepared in accordance with the ACPI. In this case, the OS/device driver 303 calls the BIOS 305 so as to collect such data as a battery pack residual capacity, a terminal voltage, a current, etc. from the controller 115 or the I/O port of the gate array logic 227 and supply the data to the application program 301. The application program 301 executes polling at an updating cycle specified by the user so as to obtain and display power consumption data.

According to this method, however, the possibility of data collection depends on the function of the OS. To avoid this problem, therefore, the application program 301 is provided with an interface that enables data to be obtained directly from the gate array logic 227 in the hardware layer in another embodiment of the present invention. This application program includes device drivers, so it can access the object hardware directly. The gate array logic 227 enables the controller 115 to increase the number of I/O ports. The controller 115 has I/O ports 62h and 66h for communicating with external devices. Those I/O ports 62h and 66h are dedicated to power management, however. Because those I/O ports 62h and 66h cannot be used for other purposes, another port is needed to send battery data to the application program 301. Consequently, if the controller 115 has a port for communicating with the BIOS 305 and another port for communicating with the application program 301, the gate array logic is omissible.

Figure 5:
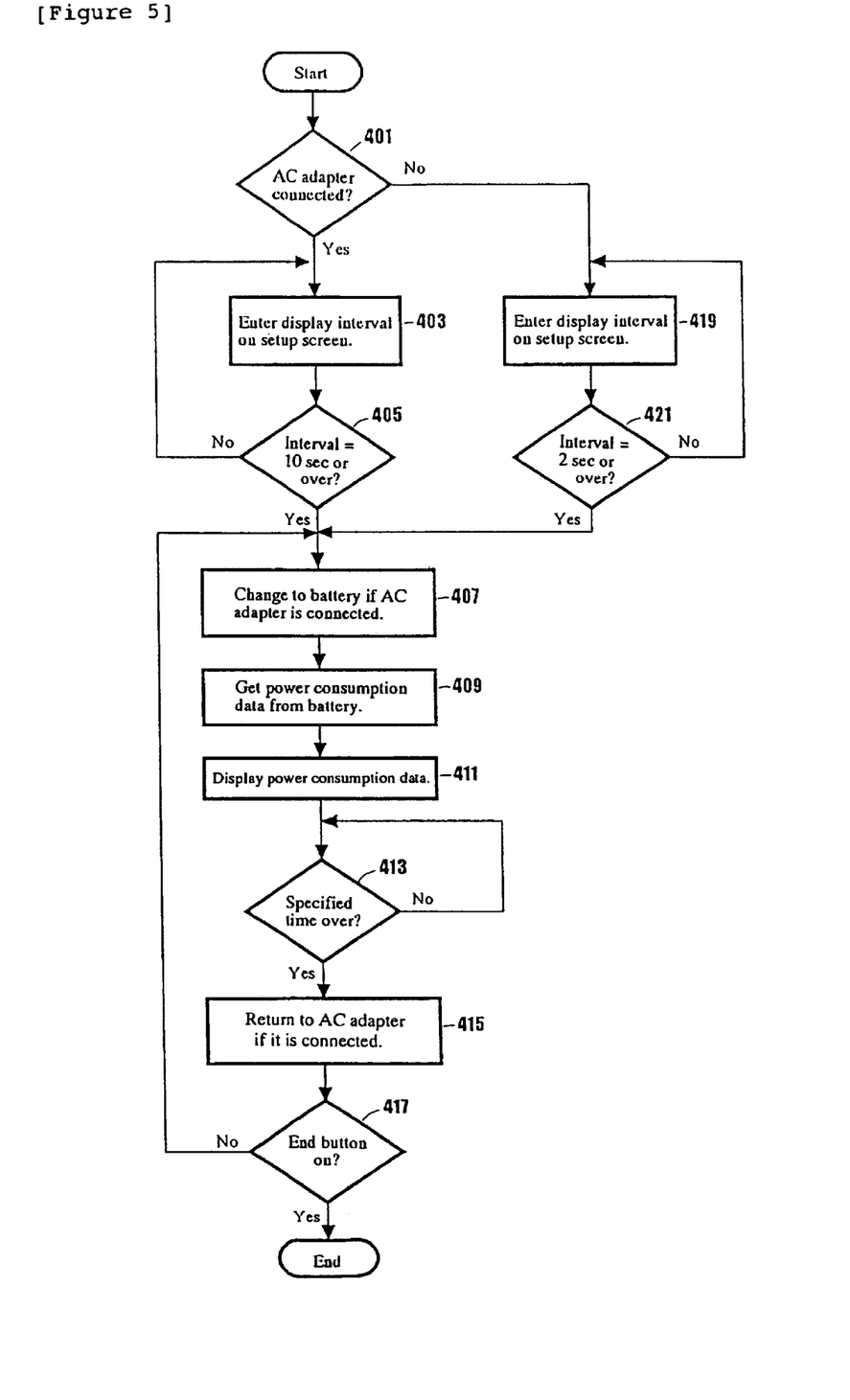
FIG. 5 is a flowchart of a procedure in an embodiment of the present invention.
Figure 6:
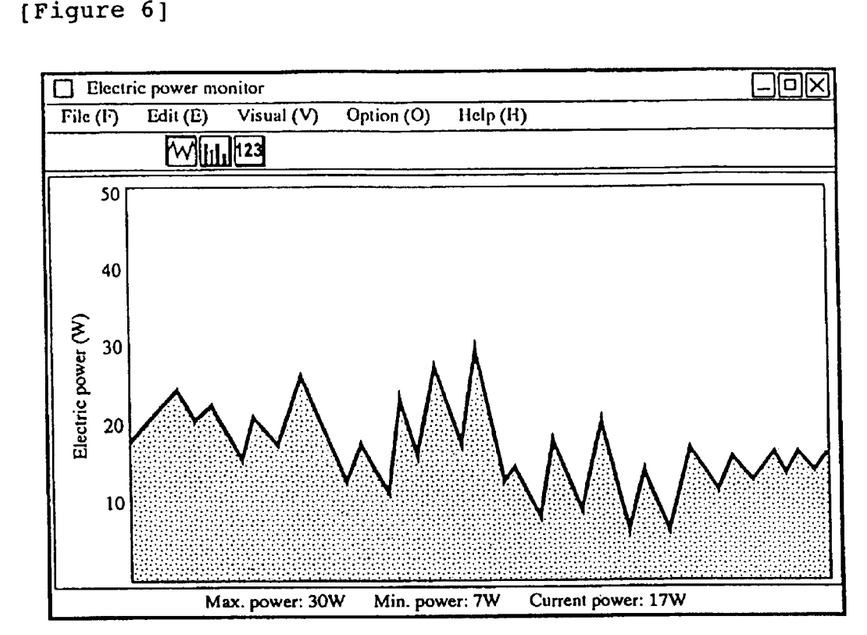
FIG. 6 is an embodiment of an electric power display window screen.
Figure 7:
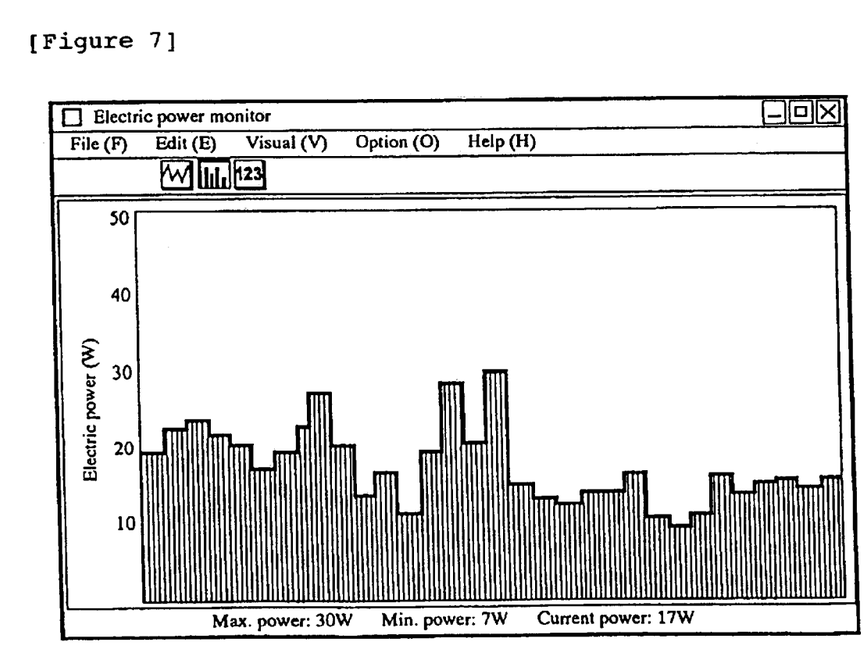
FIG. 7 is an embodiment of an electric power display window screen.
Figure 8:
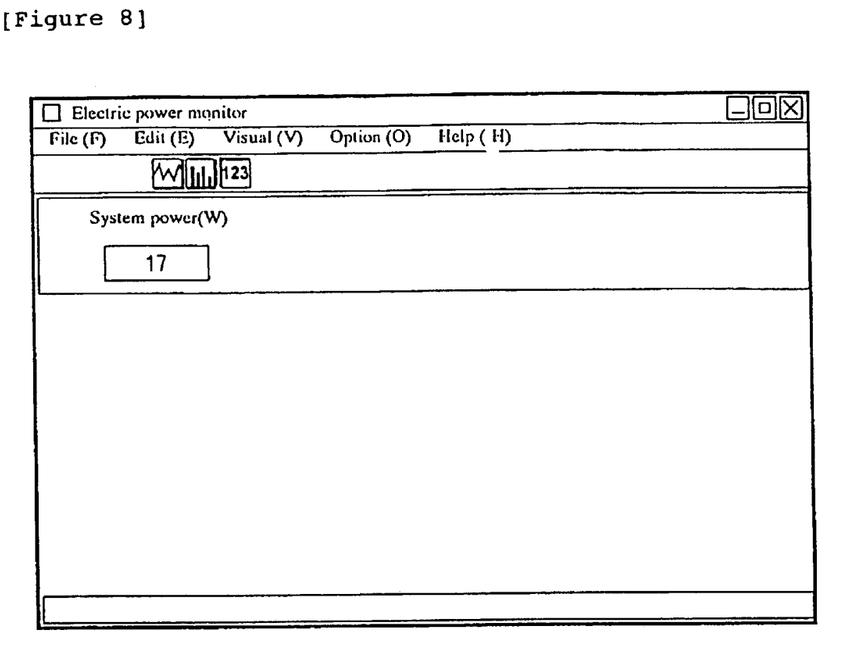
FIG. 8 is an embodiment of an electric power display window screen.

FIG. 5 shows a flowchart denoting the procedure of the embodiment of the present invention. In block 401, it is decided whether or not the AC adapter 101 is connected to the PC 100. This block is realized when a known dedicated hardware mechanism sends a signal to the controller 115. If it is decided by the controller 115 that the AC adapter is connected, the controller 115 sends the command to the OS so that the OS recognizes the effect. If the controller 115 changes the power source specially for displaying an electric power in response to a command from the application program 301 while the AC adapter is connected, the controller 115 keeps sending a command denoting that the AC adapter is connected to the BIOS 305 or the OS/device driver 303. Consequently, the OS decides that power supply from the AC adapter is continued on even when the power source is changed to the battery pack 103 temporarily so as to collect power consumption data.

As a result, it is unnecessary for the PC 100 to perform power management each time power consumption data is collected when it is driven by the battery. When the PC 100 is driven by the battery, the power of the PC 100 is limited more than when it is driven by the AC adapter. Therefore, the unnecessary degradation of the performance of the PC 100 is overcome due to the collection of power consumption data.

In block 403, the application program 301, when started up by the user, displays a screen for prompting the user to enter intervals for displaying power consumption or updating. In block 405, the application program is executed so that the user sets the intervals for displaying the power consumption data to be entered to the above input screen to a value over 10 sec.

According to the present invention, because the power source to the PC 100 is replaced with a battery so as to enable the power consumption data to be displayed even when the PC is driven by the AC adapter, the battery power is discharged as much and requested to be charged. Consequently, if the display interval value is set too short in block 403, the battery cannot be charged enough. This is why the interval value must be set to 10 sec. or over. If it is decided that the AC adapter is not connected in block 401, system goes to block 419, where an entry of a power consumption display interval is requested. Then, the application program is executed to prompt the user to set 2 sec. or over for the display interval in block 421. Prompting the user to set 2 sec. or over in step 421 is to prevent the load of the controller 115 from increasing to an extent that disturbs execution of other functions and the operation of the application program 301 from an adverse influence to be exerted on the power consumption.

In block 407, the power supply, if it is the AC adapter, is changed to the battery pack. In block 409, the application program 301 obtains the power consumption data obtained by the controller 115 from the battery pack 103. In this case, the application program 301 reads the power consumption data stored in the gate array logic 227 directly as described with reference to FIG. 4.

In block 411, the application program 301 displays the obtained power consumption data obtained from the battery pack on the display 207. The time for changing the power supply from the AC adapter to the battery pack once so as to obtain the power consumption data as described above should preferably be 1 to 2 sec. In block 413, a time lapse of a display interval set in block 403 or 419 is measured. If a predetermined time is over, system goes to the next block for updating the power consumption data. In block 415, if the battery pack is used temporarily so as to measure the power consumption in block 407, the power source is changed from the battery pack to the AC adapter. In addition, the procedure for obtaining new power consumption data via block 417 is repeated. The user can stop the display of the power consumption data as needed in block 417.

Figure 9:
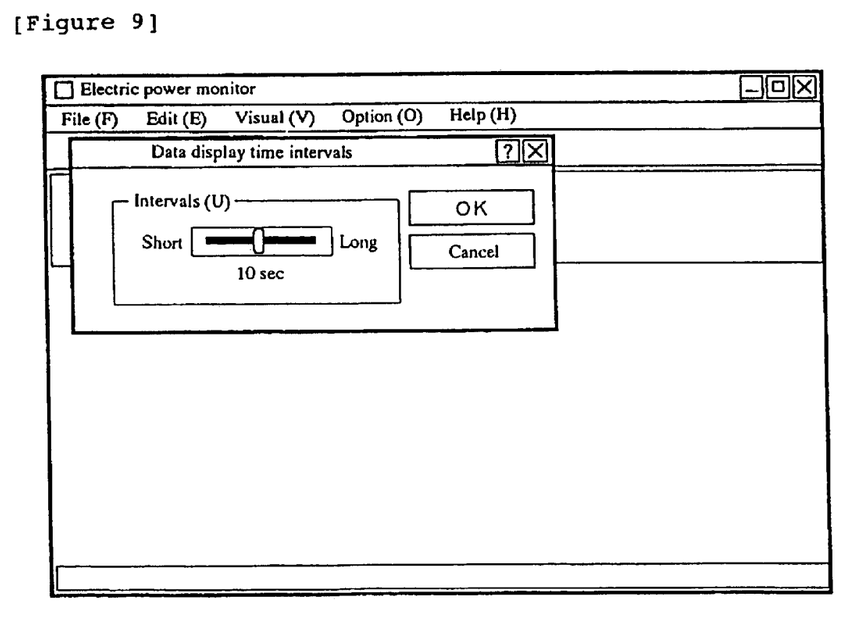
FIG. 9 is an embodiment of a window screen for setting a display interval.

FIGS. 6 through 9 show user information related to power consumption displayed on the display. In each of FIGS. 6 through 8, there are three radio buttons disposed in the window. The user can select any of the windows employed for the line graph shown in FIG. 6, the bar graph shown in FIG. 7, and value information shown in FIG. 8. FIG. 9 also shows another window for setting a display interval set in block 403 or 419. The application program 301 supplies those user interfaces (windows).

What is claimed is:

1. A method for collecting and displaying information concerning power consumption of a battery pack, enabled for producing information of its condition, that is connected to an electronic device, said electronic device having a display and being powered by an AC adapter or said battery pack, said method enabling the sending of information concerning power consumption during intervals when AC adapter power is being supplied, said method comprising the steps of:

intermittently stopping supply of electrical power by said AC adapter for a predetermined time, when said AC adapter is supplying electrical power to said electronic device, so as to temporarily force supply of said electric power to said electronic device to be from said battery pack;

obtaining information concerning a power consumption value from said battery pack during said interval; and, displaying said information concerning the power consumption value on said display, whereby battery information is collected and displayed that is not influenced by electrical power from said AC adapter.

2. The method according to claim 1, comprising the further step of:

processing said information concerning the power consumption value obtained from said battery pack prior to displaying said information on said display and where the interval between stopping the supply of AC Adapter power is 10 seconds or more and the duration of stopping is two seconds or less.

3. An electronic device driven by an AC adapter or a battery pack enabled for the sending of information concerning battery power consumption, comprising:

a signal controllable switch connected between said AC adapter and said electronic device for shutting off electric power supplied from said AC adapter in response to a control signal and selecting power supply from said battery pack;

a micro-controller for outputting a control signal intermittently to said switch for a predetermined time interval so as to shut off said AC adapter electric power to said electronic device, and for receiving information concerning a power consumption value from said battery pack and outputting said information concerning power consumption; and a display for displaying information concerning the power consumption value output from said micro-controller, whereby information concerning the battery pack is obtained without the influence of the AC adapter.

4. An electronic device comprising:

a battery pack enabled to communicate information concerning battery power consumption;

a power supply having an AC adapter and said battery pack;

a line coupled to said electronic device for supplying electric power to said electronic device from said battery pack which supplies electric power when the AC power is lost;

a controllable switch for shutting off electric power supplied from the AC adapter, in response to a control signal, and, thereby, selecting power from said battery pack;

a controller, coupled to said battery pack and said controllable switch, which intermittently applies a control signal to said switch for a predetermined time interval so as to shut off the power from the AC adapter to said electronic device and, during said time interval receives power consumption information from said battery pack, and outputs said information concerning power consumption if said line is used to supply electric power; and a display, coupled to said communication controller, which displays power consumption information output from said controller in one of the formats selected from the group consisting of a line graph, a bar graph and value information whereby inormation of battery condition is displayed which is not influenced by the AC adapter.

5. The electronic device according to claim 4, wherein said controller reduces the frequency of collection of power consumption information when said electronic device is powered by said battery pack whereby unnecessary battery performance degradation is avoided gololy due to the collection and display of power consumption data and wherein the electronic device has power saving that is normally active when the battery pack is powering said electronic device, which is signalled to be inactive during said interval.

* * * * *